United States Patent
Lifshey

[11] Patent Number: 6,009,691
[45] Date of Patent: Jan. 4, 2000

[54] WELDING PROCESS

[75] Inventor: Arthur L. Lifshey, East Brunswick, N.J.

[73] Assignee: Merck & Co., Inc., Rahway, N.J.

[21] Appl. No.: 09/030,417

[22] Filed: Feb. 25, 1998

Related U.S. Application Data

[60] Provisional application No. 60/039,243, Mar. 3, 1997.

[51] Int. Cl.⁷ .............................. B65B 7/28; B65B 51/10; B65B 51/32
[52] U.S. Cl. ............................. 53/478; 53/329.2; 53/489
[58] Field of Search .................. 53/478, 329.3, 53/329.4, 329.2, 329.5, 373.8, 374.2, 488, 489

[56] References Cited

U.S. PATENT DOCUMENTS

| | | | |
|---|---|---|---|
| 3,325,969 | 6/1967 | Bemiss et al. | 53/373.8 X |
| 3,792,566 | 2/1974 | Kinney | 53/329.2 |
| 3,874,145 | 4/1975 | Schmidt | 53/373.8 X |
| 3,937,645 | 2/1976 | Ascoli et al. | 53/329.3 X |
| 4,167,092 | 9/1979 | Medwed | 53/329.3 |
| 5,117,613 | 6/1992 | Pfaffmann | 53/329.3 X |
| 5,152,418 | 10/1992 | Kroeschell et al. | 220/359 |
| 5,379,572 | 1/1995 | Giovannone | 53/329.3 X |
| 5,624,057 | 4/1997 | Lifshey | 222/212 |

FOREIGN PATENT DOCUMENTS

| | | |
|---|---|---|
| 1564895 | 5/1978 | United Kingdom . |
| 2107640 | 9/1982 | United Kingdom . |
| 2196312 | 4/1988 | United Kingdom . |
| 2236099 | 3/1991 | United Kingdom . |

*Primary Examiner*—James F. Coan
*Attorney, Agent, or Firm*—Elliott Korsen; Mark R. Daniel

[57] ABSTRACT

A process of welding plastic vials and closure suitable for sterile filling operations is disclosed. Following a mechanical seal, a heated die is used to fuse the container and closure into a hermetic seal capable of use in the pharmaceutical industry.

6 Claims, 3 Drawing Sheets

WELDING

FIG. 7 WELDING COMPLETED

WELDING PROCESS

This application claims benefit of U.S. Provisional Application No. 60/039,243, filed Mar. 3, 1997.

BACKGROUND OF THE INVENTION

This invention relates to a process for welding plastic vials and closures suitable for sterile filling operations. The process of the invention is suitable for any containers which must be filled and then sealed to maintain the contents in a leakproof enclosure, package or device.

Containers filled with liquid or other substances are often closed with a cap, stopper or other type of closure which uses mechanical means to effect the seal. When the closure uses an elastomer, such as rubber, as one of the sealing surfaces, bearing against a relatively hard surface, such as rigid plastic, glass or metal, a leakproof seal is generally obtained.

However, when a seal is created by mechanical means between two rigid materials, the surface must be nearly perfect, and free of any defects which will interfere with the seal. Alternatively, the assembly forces (usually torque) must be great enough to create a localized high pressure area, and thus some deformation of the interface to create the seal. This will often result in high assembly stress. Also, high assembly torque often lead to problems such as opening difficulty and sometimes stress fracture. Because of the difficulty in obtaining a leakproof joint with only mechanical means, heat seals or welds are often used between plastic containers and closures.

The fusion welding of thermoplastic materials generally requires pressure and temperature. The pressure must be at the interface between the materials being welded. The temperature must be provided by means for heating the interface above the melting temperature of the materials being welded. Examples of this type of welding include the induction seal on containers of liquid food products, solvents, lubricants, medications, etc. In these types of seals, a foil/plastic film laminate is heat sealed or welded to the container by heating at the interface while maintaining mechanical pressure. An example of this is a foil/plastic seal, where the seal is held against the plastic container, for instance, with a screw cap. The heat is applied directly to the interface by heating the metal first, which is laminated to the plastic film.

Thin materials, such as plastic films, which are about 0.25 mm thick, can be easily sealed by applying heat and pressure from heated platens on one or both sides of the joint. However, when the plastic is thick, e.g., 1.0 mm or thicker, it is difficult to transmit the heat through the plastic to the interface without distorting or thinning the plastic. A common solution to this is hot plate welding which places a heated metal platen between the two surfaces to be welded, which creates melting at the interface. The platen is removed and the surfaces are pushed together and held until solidified into a good weld. This process, while satisfactory in some situations, is not suited for sterile filled products with very crucial clean-room requirements such as pharmaceuticals. Other possible ways of welding thick plastics include vibration and ultrasonic welding but these also tend to be too prone to particulate generation for use in clean-room and sterile filling applications.

The process of this invention relates to a method of first creating a mechanical seal between a vial and closure plug comprised of the same, similar, or compatible thermoplastic resin material. A heated die of a specific shape is then used to remelt and reform the interface in order to weld the components into a single hermetically sealed container. The die generally has a concave shape in order to move the molten plastic resin into a confined volume. As the die continues its travel into the interface between the two components being joined, the confined volume becomes filled, and molten mass is now subjected to hydraulic pressure. The process is completed just after the confined area is completely filled and excess molten plastic begins to flow out of the joint. This excess material, frequently referred to as flash, is visual evidence of sufficient heat and pressure necessary to create a high quality weld.

SUMMARY OF THE INVENTION

There is disclosed a process for welding plastic vials and closures which comprises creating a mechanical seal between the material to be welded, said mechanical seal is then remelted using a heat source, and the interface between the components is welded by application of the heat source in order to form an hermetic seal.

BRIEF DESCRIPTION OF THE DRAWINGS

FIG. 7 is a closeup side view of the vial and closure following the completion of the welding process.

DETAILED DESCRIPTION OF THE INVENTION

There is disclosed a process for welding plastic vials and closures which comprises creating a mechanical seal between the material to be welded, said mechanical seal is then remelted at the interface of the vial and closure using a heat source such as a heated die, and the interface is welded by application of the heat source in order to form a hermetic seal.

Figure 3:
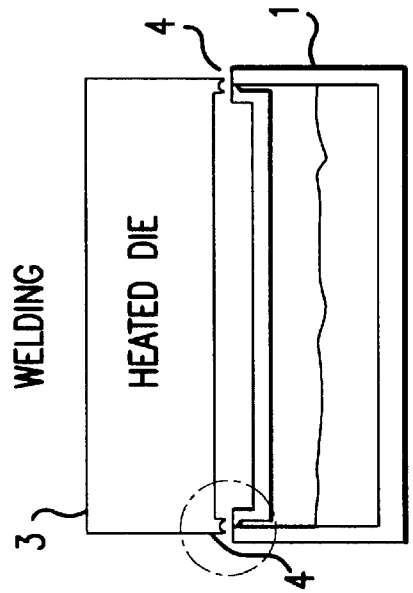
FIG. 3 is a side view of the vial with closure as it is contacted by the heated die with a general concave shape.
Figure 2:
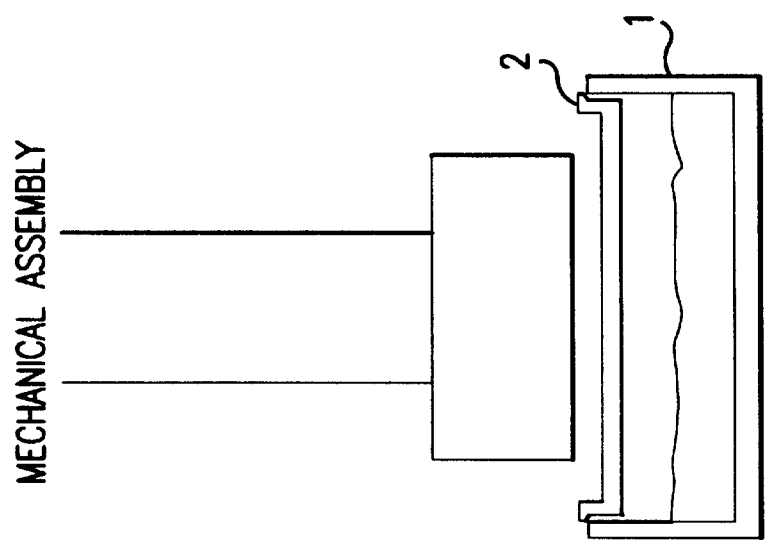
FIG. 2 is a side view of the filled vial with closure being mechanically assembled.
Figure 1:
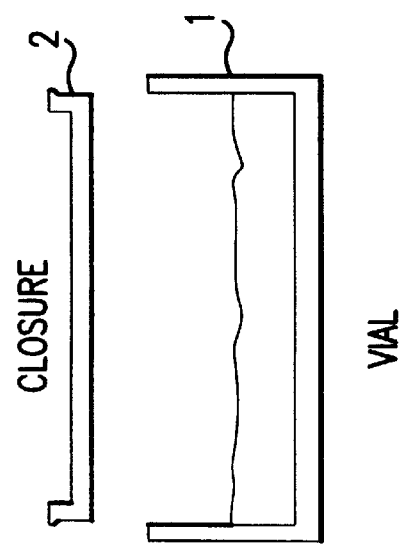
FIG. 1 is a side view of the filled vial and the closure prior to mechanical closure.

Referring now to the drawings where like numerals represent like elements throughout various views. FIG. 1 shows the filled container 1 prior to mechanical closure by closure 2. FIG. 2 shows the mechanical seal which can be effectuated in any manner known in the art to effectively seal a container. FIG. 3 shows the already mechanically closed container being contacted by the heated die 3 wherein the contacting points of the die 4 are concave in order to effectuate the seal and force out any excess melted material as flash 6. The shape of the heated die, while preferably concave, may also be flat, convex or any other shape that would form a hermetic seal. The die may be coated with a material with good release properties such as polytetrafluoroethylene (PTFE), ceramics or metal oxides in order to prevent adhesion of the melted plastic to the heated die.

Figure 5:
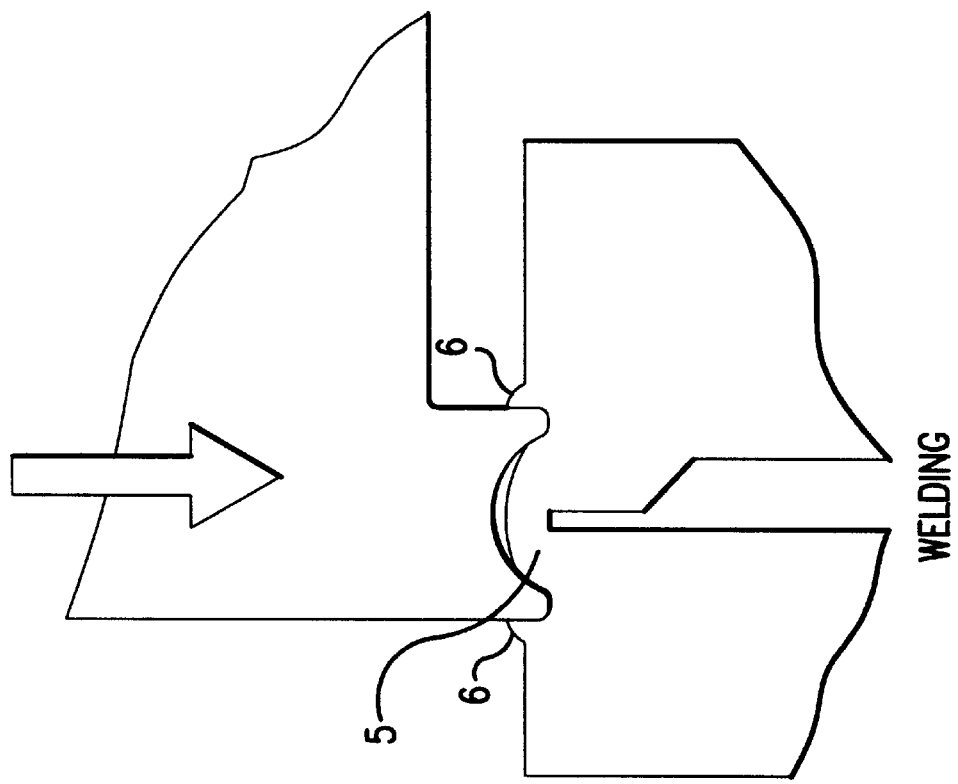
FIG. 5 is a closeup side view as the heated die with a general concave shape is moved downward and contacts the vial/closure interface.
Figure 4:
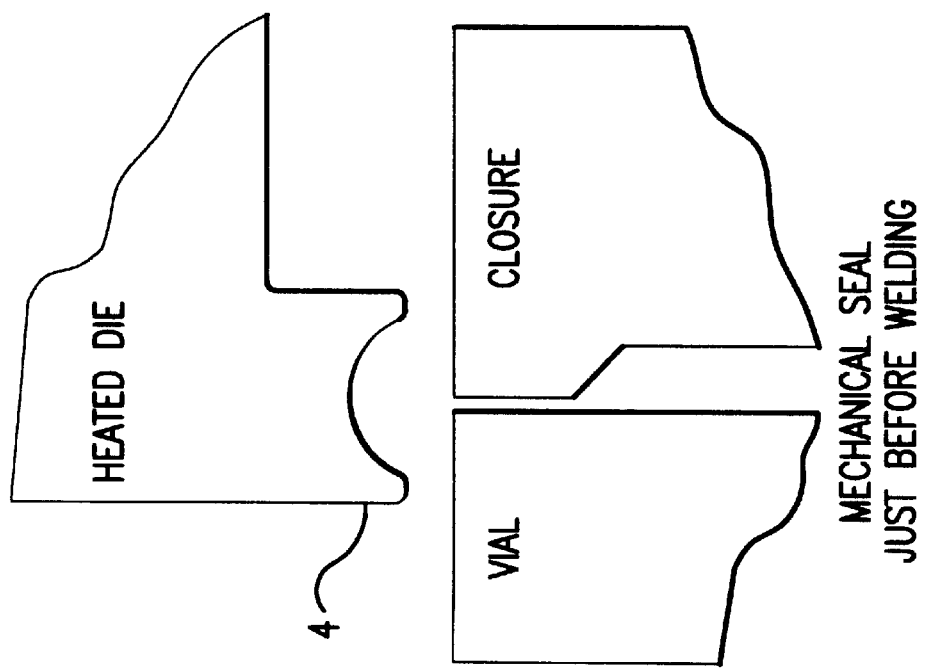
FIG. 4 is a closeup side view of the vial and mechanical closure joint prior to welding.
Figure 6:
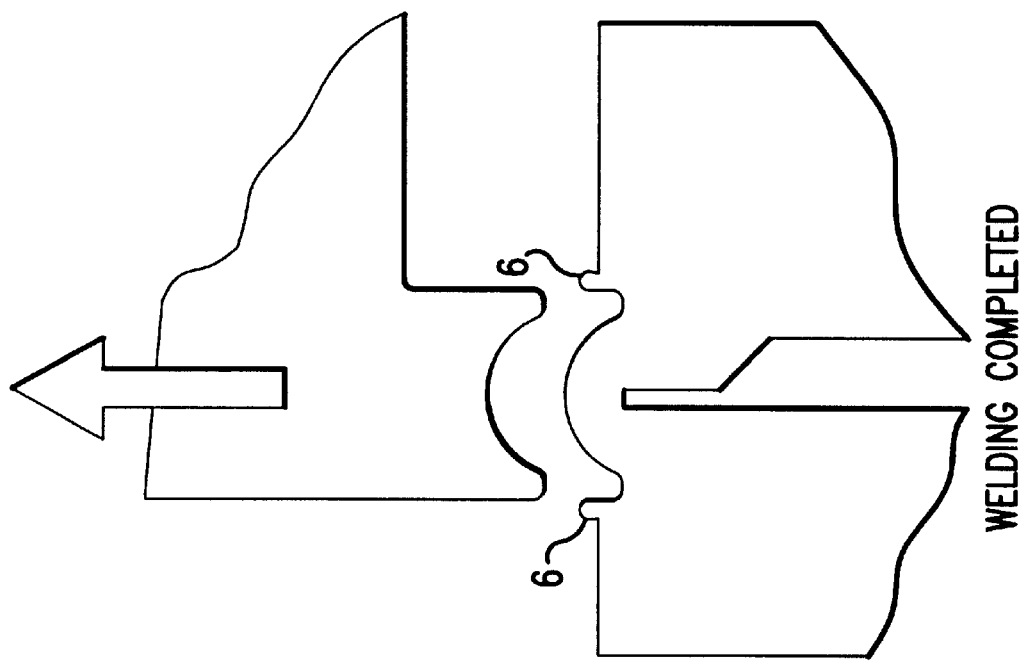
FIG. 6 is a closeup side view of the welded vial and closure with the excess material forced out as flash.
Figure 6:
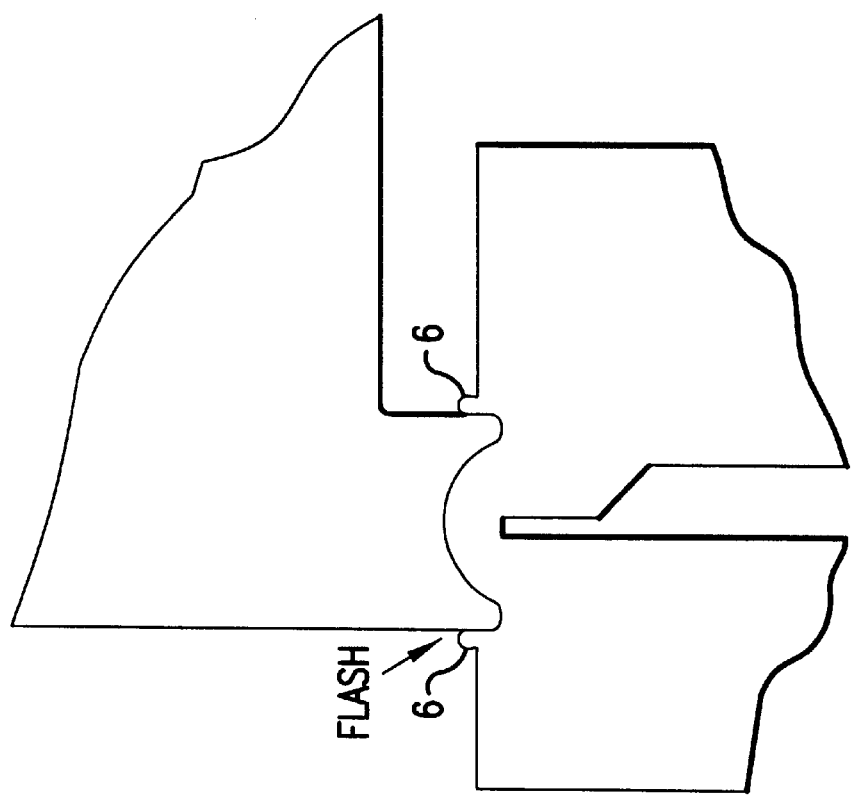

FIG. 5 shows a close-up view as the heated die contacts the mechanically closed container resulting in a melting of the container and mechanical closure in such a manner as to form a hermetic seal 5. As shown in FIG. 6, as the heated die is contacting the melted container and closure in forming the hermetic seal 5, extra container material is pushed to the sides in such a way as to form a flash 6. Upon removal of the heated die, the hermetic seal is in a convex shape with the flash showing the complimentary shape of the heated die. FIG. 7 shows the completed weld resulting in a hermetically sealed container that has been filled and manufactured in a manner that would be acceptable under the critical cleanroom criteria required in the pharmaceutical manufacturing industry.

The die or other type of heat source can be heated by any method that would result in even heating of the die. These methods include electrical resistance, inductively by application of an electric field to the metal die surface or by a suitable light source such as infrared or laser light.

The process of this invention is particularly useful in the manufacture of ophthalmic packaging such as that disclosed in U.S. Ser. No. 08/432,500 filed May 1, 1995, herein incorporated by reference.

While the preferred embodiments of the inventions have been described in detail, modifications and adaptations may be made thereto without departing from the spirit and scope of the invention.

What is claimed is:

1. A method for welding plastic containers and closures suitable for sterile filling operations comprising:
   a) creating a mechanical seal between the container and closure to be welded;
   b) heating the mechanical seal with a heated die having a concave-shape contact surface to melt the container and closure; and
   c) removing the heated die means leaving a hermetic, leakproof seal.

2. The method of claim 1 wherein the heating die is heated by electrical resistance.

3. The method of claim 1 wherein the heating die is inductively heated by application of an electric field to the metal die surface.

4. The method of claim 1 wherein the heating die is inductively heated by a suitable light source such as infrared or a laser.

5. The method of claim 1 wherein the heating die is sequentially heated and cooled while in contact with the components to be welded.

6. The method of claim 1 wherein the heating die contact surface is suitably coated with a material with good release properties to prevent adhesion of the melted plastic at the joint to the heated die.

* * * * *